July 29, 1941.                J. L. FINCH                2,250,578
                      TRANSMITTER CONTROL CIRCUIT
                         Filed Nov. 18, 1939
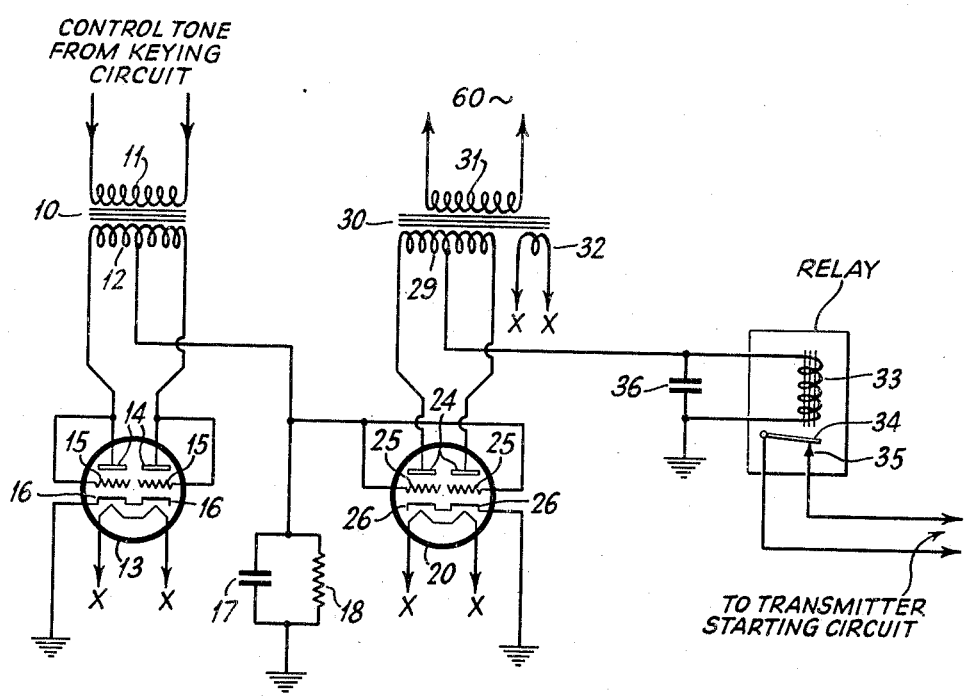
INVENTOR.
JAMES L. FINCH
BY
ATTORNEY.

Patented July 29, 1941

2,250,578

UNITED STATES PATENT OFFICE 2,250,578

TRANSMITTER CONTROL CIRCUIT

James L. Finch, Patchogue, N. Y., assignor to Radio Corporation of America, a corporation of Delaware Application November 18, 1939, Serial No. 305,107

6 Claims. (Cl. 250—17)

The present invention relates to transmitter control circuits and, more particularly, to a circuit which is energized by a control tone and which in response to the application of the control tone starts up a remotely located transmitter.

An object of the present invention is to provide a transmitter control circuit which will start the transmitter immediately upon the application of control tone to the keying circuit.

Another object of the present invention is to provide a transmitter control circuit which will start the transmitter immediately with the appearance of signals in the keying circuit associated with the transmitter and which will close down the transmitter after a predetermined time in which no signals are transmitted.

Another object is to provide a control circuit which does not require batteries for its energization.

Another object of the invention is to provide a control circuit including a time constant circuit which requires only comparatively small values of capacity therein.

A further object of the invention is the provision of a control circuit which does not require the use of electrolytic condensers.

The present invention contemplates the provision of a rectifier circuit which will rectify the wave energy of the signal appearing in the keying circuit, a storage device for storing the rectified wave energy and means for biasing the grids of a twin triode control tube connected in a push-pull relationship in accordance with the energy stored in said storage device. The push-pull output of the control tube is applied to a relay which has contacts arranged to turn on the transmitter upon the cessation of current through the control tube.

A control circuit constructed in accordance with the present invention has among its advantages the following:

(1) The transmitter starts up as soon as tone is supplied to the control circuit with negligible delay;

(2) No batteries are required;

(3) Full wave rectification is used for energizing the relay and thus a small value of smoothing condenser is required;

(4) No electrolytic condensers are required since such condensers may, under some circumstances, not be entirely reliable;

(5) Mechanical delay circuits which are in some circumstances, such as extremes of temperature and humidity, unreliable, are entirely eliminated;

(6) Failure of the automatic start equipment will be more apt to leave the transmitter running than to leave it shut down.

Further objects and advantages of the present invention will become apparent from the following detailed description which is accompanied by a drawing which shows schematically one embodiment of the present invention.

Referring, now, to the drawing, reference numeral 10 indicates an input transformer having a primary winding 11 which is connected to the keying circuit controlling the transmitter (not shown). The secondary 12 of transformer 10 is center-tapped and has its end terminals connected to plates 14 of rectifier tube 13. The tube 13 as shown here is a conventional dual triode tube with the grids 15 connected in parallel with plates 14. This connection is desirable since then the same type of tube may be used in both the rectifier position and control tube position. While dual triode tubes have been shown, of course, if desired, physically separate triodes may be used. It is also contemplated that other types of rectifiers may be used if desired.

The center-tap of winding 12 is connected to one end of the shunt connected condenser 17 and resistance 18 forming the grid-cathode circuit of tube 20 while the cathodes 16 and 26 of both tubes are connected to a common ground. A full wave rectifier circuit for the control tone is thus formed, the resultant rectified voltage being applied between grids 25 and cathodes 26 of control tube 20. The plates 24 of tube 20 are connected to the opposite ends of a center-tapped secondary winding 29 of a power supply transformer 30. The primary 31 of power supply 30 is connected to the conventional 60 cycle alternating current supply. A filament supply winding 32 is also shown as forming a part of the transformer 30. The connections between this winding and the filaments of tubes 13 and 20 have not been shown in detail but merely indicated by the conventional arrows X, X.

The anode circuit for tube 20 is completed from the center-tap of winding 29 through the operating winding of relay 33 and thence back to ground. The operating winding of relay 33 is shunted by a condenser 36 in order to avoid any possibility of contact chatter due to the pulsations of the rectified 60 cycle current. Relay 33 operates a movable contact arm 34 having a back contact 35. Contacts 34 and 35 are normally closed and are so connected to the transmitter start circuit that when contact arm 34 is in its back position the transmitter is energized. The operation of the circuit described is as follows: The tone supplied from the keying circuit through transformer 10 is rectified by the first tube 13. The rectified current charges condenser 17 in a very short interval, on the order of two-tenths of a second. The voltage appearing across condenser 17 as a result of the charge biases the tube 20 to cut-off. About 10 volts is ordinarily required to bias tube 20 completely to cut-off. Thus, when tone is supplied from the keying circuit, tube 20 is biased to cut-off, relay 33 releases and contacts 34 and 35 close and the transmitter is energized almost instantaneously upon the appearance of signals in the keying circuit. When the tone disappears in the control circuit due to a cessation in keying, condenser 17 is gradually discharged through resistance 18. After a suitable delay determined by the time constant of the condenser 17 and resistance 18 the bias is removed from grids 25 sufficiently that tube 20 conducts current and rectifies current from transformer 30. This current flowing through the anode circuit energizes relay 33 drawing contact 34 away from contact 35 and de-energizing the transmitter. Tube 20 will ordinarily be so arranged that it will conduct sufficient current to close the relay when the voltage across condenser 17 is less than 5 volts. As long as tube 20 is biased to cut-off, any signalling impulse in the keying circuit will entirely recharge the condenser 17 so that the full delay period will again be required before the transmitter is shut down.

An example will now be given of typical values of circuit constants which may be used. If the level of the tone supply in the keying circuit is +18VU, condenser 17 has a value of 20 microfarads and resistor 18 a value of 10 megohms, the transmitter will be de-energized after a cessation of the control tone of about 8 minutes. If the tone level is +15VU the delay will be about 6 minutes and if it is +12VU the delay will be about 4 minutes. If a shorter delay is required it may be obtained by utilizing a lower capacity of condenser 17 and/or a lower value of resistor 18 or by further decreasing the tone level in the primary of transformer 10.

While I have particularly shown and described an embodiment of the present invention and have given certain specific values which my experience has shown to be satisfactory, it is to be clearly understood that my invention is not limited thereto but that modifications may be made within the scope of this invention.

I claim:

1. A transmitter control device comprising a rectifier, means for applying wave energy to said rectifier, means for storing rectified wave energy connected to said rectifier, a second rectifier having a control means connected to said storage means whereby said second rectifier is biassed to an inoperative condition by a predetermined amount of said stored energy, a source of alternating current and a relay having a winding connected in series with said source of alternating current and said second rectifier, said relay having a pair of normally closed back contacts in a control circuit adapted to energize said transmitter whereby said transmitter is operative as long as at least said predetermined amount of stored energy is maintained.

2. A transmitter control device comprising a first rectifier, means for applying wave energy to said rectifier, means for storing rectified wave energy connected to said first rectifier, a second rectifier having a control means connected to said storage means whereby said second rectifier is biassed to an inoperative condition by a predetermined amount of said stored energy, a source of alternating current and a relay having a winding connected in series with said source of alternating current and said second rectifier, said relay having a pair of normally closed back contacts in a control circuit adapted to energize said transmitter whereby said transmitter is operative as long as at least said predetermined amount of stored energy is maintained and a leak circuit across said storage means whereby cessation of said wave energy for a predetermined time causes said second rectifier to become conductive and open said contacts.

3. A transmitter control circuit comprising a source of intermittent wave energy, a rectifier connected to said source, a condenser connected to the output of said rectifier, a source of alternating current, a relay winding and a second rectifier connected in a series circuit, said relay having a pair of normally closed back contacts adapted to control said transmitter and means responsive to energies stored in said condenser for controlling said second rectifier.

4. A transmitter control circuit comprising a source of wave energy, a rectifier connected to said source, a condenser connected to the output of said rectifier, a resistance connected in shunt to said condenser, a full wave rectifier circuit including a grid controlled rectifier tube, a source of alternating current, a relay winding connected between said alternating current source and said rectifier tube, said relay having a pair of normally closed back contacts adapted to control said transmitter and means for utilizing the charge on said condenser to control the operation of said rectifier tube.

5. A transmitter control circuit comprising a source of intermittent wave energy, a rectifier connected to said source, a condenser connected to the output of said rectifier, a pair of thermionic discharge tubes each having an anode, a cathode and a control electrode, said cathodes and control electrodes being connected in parallel and to said condenser, a source of alternating current, a transformer having a primary connected thereto and a center-tapped secondary, connections from the ends of said secondary to the anodes of said tubes and a relay having a winding connected from said center-tap to said cathodes, said relay having a pair of normally closed back contacts adapted to control said transmitter.

6. A transmitter control circuit comprising a source of wave energy, a rectifier connected to said source, a condenser connected to the output of said rectifier, a resistance connected in shunt to said condenser, a pair of thermionic discharge tubes each having an anode, a cathode and a control electrode, said cathodes and said control electrodes being connected in parallel and to said condenser, a source of alternating current, a transformer having a primary connected thereto and a center-tapped secondary, connections from the ends of said secondary to the anodes of said tubes and a relay having a winding connected from said center-tap to said cathodes, said relays having a pair of normally closed back contacts adapted to control said transmitter.

JAMES L. FINCH.